(12) United States Patent
Welch et al.

(10) Patent No.: US 6,262,685 B1
(45) Date of Patent: Jul. 17, 2001

(54) PASSIVE RADIATOR

(75) Inventors: Eugene E. Welch; Grant R. Whissemore, both of Waseca, MN (US)

(73) Assignee: Itron, Inc., Waseca, MN (US)

( * ) Notice: Subject to any disclaimer, the term of this patent is extended or adjusted under 35 U.S.C. 154(b) by 0 days.

(21) Appl. No.: 09/178,213

(22) Filed: Oct. 23, 1998

Related U.S. Application Data
(60) Provisional application No. 60/063,263, filed on Oct. 24, 1997.

(51) Int. Cl.$^7$ ....................................................... H01Q 1/04
(52) U.S. Cl. .......................... 343/719; 343/795; 343/872; 340/870.02
(58) Field of Search ............................ 343/719, 700 MS, 343/795, 702, 872; 340/870.02, 870.03, 870.06, 870.37; 455/41, 88; H01Q 1/04

(56) References Cited

U.S. PATENT DOCUMENTS

| | | |
|---|---|---|
| 1,781,280 | 11/1930 | Haase et al. . |
| 3,059,849 | 10/1962 | Saltzman . |
| 3,475,755 | 10/1969 | Bassen et al. . |
| 3,641,576 | 2/1972 | Farbanish . |
| 3,729,727 | 4/1973 | Young et al. . |
| 3,913,400 | 10/1975 | Floren . |
| 3,947,850 * | 3/1976 | Kaloi ...................................... 343/795 |
| 4,051,480 | 9/1977 | Reggia et al. . |
| 4,085,287 | 4/1978 | Kullmann et al. . |
| 4,205,315 | 5/1980 | Fleenor . |
| 4,229,745 | 10/1980 | Kruger . |
| 4,230,234 | 10/1980 | Taylor . |
| 4,303,923 | 12/1981 | Bitter, Jr. et al. . |
| 4,305,078 | 12/1981 | Jones, Jr. et al. . |
| 4,316,194 | 2/1982 | De Santis et al. . |
| 4,463,354 | 7/1984 | Sears . |
| 4,491,792 | 1/1985 | Bullock et al. . |
| 4,491,793 | 1/1985 | Germer et al. . |
| 4,518,965 | 5/1985 | Hidaka . |
| 4,520,423 | 5/1985 | Sutherland . |
| 4,633,262 | 12/1986 | Traut . |
| 4,638,314 | 1/1987 | Keller . |
| 4,672,386 | 6/1987 | Wood . |
| 4,687,445 | 8/1987 | Williams . |
| 4,709,239 | 11/1987 | Herrick . |

(List continued on next page.)

FOREIGN PATENT DOCUMENTS

| | | |
|---|---|---|
| 0 252 184 A1 | 1/1988 | (EP) . |
| 40155222 | 5/1992 | (JP) . |

OTHER PUBLICATIONS

Conformal Dielectric–Filled Edge–Slot Antennas with Inductive–Post Tuning, IEEE Transactions on Antennas and Propogation, vol. AP–27, No. 5, pp. 713–716, Sep. 1979.

*Primary Examiner*—T. Phan
(74) *Attorney, Agent, or Firm*—Patterson, Thuente, Skaar & Christensen, P.A.

(57) ABSTRACT

An ERT (Encoder, Receiver, Transmitter) for monitoring the consumption of a metered commodity and having an ERT transmitter for transmitting a signal related to commodity consumption, the ERT transmitter being disposed internally in an ERT housing, the ERT housing providing for the transmission of RF energy therethrough, includes a passive radiator being disposed external to the ERT housing and being communicatively, capacitively coupled to the ERT transmitter and receiving RF wireless communications from the ERT transmitter for wireless transmission. The passive radiator includes a radiator device being disposed spaced apart from an ERT antenna and being communicatively, capacitively coupled to the ERT antenna for enhancing the reception and transmission of RF wireless communications by an ERT transmitter/receiver. A method of enhancing transmission and reception of wireless RF energy communications is also included.

43 Claims, 5 Drawing Sheets

U.S. PATENT DOCUMENTS

| | | |
|---|---|---|
| 4,758,836 | 7/1988 | Scuilli . |
| 4,793,192 | 12/1988 | Jerger et al. . |
| 4,799,059 | 1/1989 | Grindahl et al. . |
| 4,801,944 | 1/1989 | Madnick et al. . |
| 4,847,626 | 7/1989 | Kahler et al. . |
| 4,868,566 | 9/1989 | Strobel et al. . |
| 4,998,102 | 3/1991 | Wyler et al. . |
| 5,041,838 | 8/1991 | Liimatainen et al. . |
| 5,061,944 * | 10/1991 | Powers et al. .................... 343/795 |
| 5,153,600 | 10/1992 | Metzler et al. . |
| 5,155,481 | 10/1992 | Brennan, Jr. et al. . |
| 5,298,894 | 3/1994 | Cerny et al. . |
| 5,371,496 | 12/1994 | Tanamachi . |
| 5,382,959 | 1/1995 | Pett et al. . |
| 5,438,338 | 8/1995 | Thill . |
| 5,532,708 | 7/1996 | Krenz et al. . |
| 5,539,418 | 7/1996 | Egashira et al. . |
| 5,579,020 | 11/1996 | Kinsey . |
| 5,583,492 | 12/1996 | Nakanishi et al. . |
| 5,596,316 | 1/1997 | Honeck . |
| 5,600,333 | 2/1997 | Justice et al. . |
| 5,621,419 * | 4/1997 | Meek et al. ...................... 343/770 |
| 5,659,300 | 8/1997 | Dresselhuys et al. . |
| 5,710,568 * | 1/1998 | Shirazi et al. .................... 343/719 |
| 5,825,303 * | 10/1998 | Bloss et al. .................... 340/870.02 |

* cited by examiner

PASSIVE RADIATOR

RELATED APPLICATION

This application claims the benefit of U.S. provisional application No. 60/063,263, filed Oct. 24, 1997.

TECHNICAL FIELD

The passive radiator of the present invention relates generally to the field of antennas for wireless RF transmission and reception. More particularly, the present invention relates to the reception and transmission of data relative to metered commodity consumption.

BACKGROUND OF THE INVENTION

There has been a trend in recent years to provide for the automatic reading of consumption data generated relative to metered commodity usage, such as water meters, electric meters, gas meters, and the like. The meter reading in systems designed to accommodate automatic meter reading typically rely on automated transmission of consumption data. In some systems, this transmission occurs over wires or electro-optical cables. More preferably, the transmission occurs with the radiation of wireless RF energy.

Encoder Receiver Transmitter (ERT) devices are known for use in automatic meter reading systems in which data transmission is accomplished by wireless RF transmission. The assignee of the present invention provides ERT's for virtually every gas and electric meter on the market. For gas meters, ERT installation is typically mounted directly on the gas meter. For electric ERT installation, the ERT module is typically installed inside the glass enclosure in a meter shop environment. The ERT not only collects electric or gas usage data, but also can report such information as meter tampering.

The assignee of the present invention additionally provides an ERT module for use with pit mounted water meters. The ERT module is typically, easily installed in a predrilled hole formed in the meter box lid and coupled via a cable to the water meter mounted in the pit. U.S. Pat. Nos. 5,410,246, 5,442,281, and 5,553,094 (incorporated herein by reference), assigned to the assignee of the present application, are illustrative of the design of ERT modules generally and the design of the radio communication network into which the ERT module is integrated.

Typically, the ERT has a microstrip or partially shielded antenna enclosed within a housing. The housing may be a housing unique to the ERT or the housing may be the housing of the entire meter, such as in the typical electric meter installation. A difficulty with wireless automatic meter reading systems is to ensure that transmissions to and from the meter are reliably received. The transmitter/receiver of the ERT is necessarily a relatively small device. In some installations it is battery powered by a small capacity battery. This places severe limits on the size of the ERT antenna and the power of the ERT transmitter. Accordingly, there is a need in the industry to increase the radio communication range of the ERT modules.

Further, it is understood that any device effective to increase the radio communication range of ERT modules must be potentially applicable to literally millions of installed meters. In order to be acceptable to utility companies, the cost of such a device must be kept to an absolute minimum. Probably more important than the unit cost of the device is the cost of installation of the device in each meter which must be borne by the utility. Accordingly, the most desirable device for increasing the radio communication range of the ERT module is a device that absolutely minimizes the installation cost on ERT modules already in the field.

Gas meters, electric meters, and water meters are typically installed in a number of different locations. They may be inside a building; inside a building in a moist pit; outside a building, but enclosed; and outside a building and fully exposed to the elements. A further requirement of a device for increasing the radio communication range of ERT modules is that it be able to endure the environment in which the ERT module is installed for long periods of time without maintenance attention.

SUMMARY OF THE INVENTION

The passive radiator of the present invention substantially meets the aforementioned needs of the industry. The passive radiator has a relatively inexpensive cost of manufacture. Further, installation is by merely adhering the passive radiator to a surface proximate the ERT transmitter/receiver or by the use of rivets. There is no need for physical communicative linking to the ERT transmitter/receiver as by a pair of wires or the like, such installation being substantially more labor intensive than the passive radiator of the present invention. Additionally, the adhesive used to adhere the passive radiator to the surface is preferably all weather adhesive that is preapplied to the passive radiator. The rivet type connection is also an all weather application.

The present invention is an ERT (Encoder Receiver Transmitter) for monitoring the consumption of a metered commodity and having an ERT transmitter for transmitting a signal related to commodity consumption, the ERT transmitter being disposed internally in an ERT housing, the ERT housing providing for the transmission of RF energy therethrough. The ERT includes a passive radiator being disposed external to the ERT housing and being communicatively, capacitively coupled to the ERT transmitter and receiving RF wireless communications from the ERT transmitter for wireless transmission.

Further, the present invention is a passive radiator that includes a radiator device being disposed spaced apart from an ERT antenna and being communicatively, capacitively coupled to the ERT antenna for enhancing the reception and transmission of RF wireless communications by an ERT transmitter/receiver.

Additionally, the present invention is a method of enhancing transmission and reception of wireless RF energy communications, the communications being related to commodity usage, that includes the steps of:

providing a transmitter/receiver;

disposing a passive radiator proximate the transmitter/receiver and physically space apart therefrom;

capacitively coupling a passive radiator to the transmitter/receiver; and receiving and transmitting wireless RF energy by the transmitter/receiver via the capacitively coupled passive radiator.

DETAILED DESCRIPTION OF THE DRAWINGS

Figure 2:
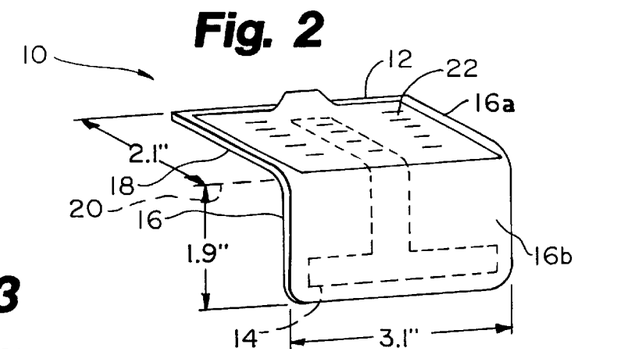
FIG. 2 is a perspective view of the radiator of FIG. 1 depicted in phantom and integrated into a laminate and bent in a preferred configuration for application to a surface proximate the ERT module transmitter/receiver.

The passive radiator of the present invention is shown generally at 10 in the figures. Referring specifically to FIG. 2, the passive radiator 10 has two major components: sheath 12 and radiator 14.

The sheath 12 is preferably formed of an upper laminate 16 and a lower laminate 18. The upper and lower laminates 16, 18 are substantially the same size and are brought into registry in order to form the sheath 12. As depicted in FIG. 2, the radiator 14 is sandwiched between the upper laminate 16 and the lower laminate 18. Once the radiator 14 is disposed as depicted in FIG. 2, the upper laminate 16 and the lower laminate 18 may be laminated or bonded together in order to form a substantially weather tight sheath 12 around the radiator 14. It should be noted that there is no penetration of the sheath 12 necessary for leads leading to the radiator 14. This considerably enhances the weather tightness of the sheath 12.

In a preferred embodiment, the upper and lower laminates 16, 18 are formed of opaque plastic sheets. Preferably, the passive radiator 10 is bent along bend line 20 prior to installation on an ERT module. The bend along the bend line 20 provides for adjoining, outwardly directed surfaces 16a and 16b of the upper laminate 16. A pre-applied all-weather adhesive 22 is imposed on surface 16a. A releasable liner 24 is releasably adhered to the adhesive 22 in order to shield the adhesive 22 from unwanted contact with objects prior to installation of the passive radiator 10 proximate an ERT module.

Figure 1:
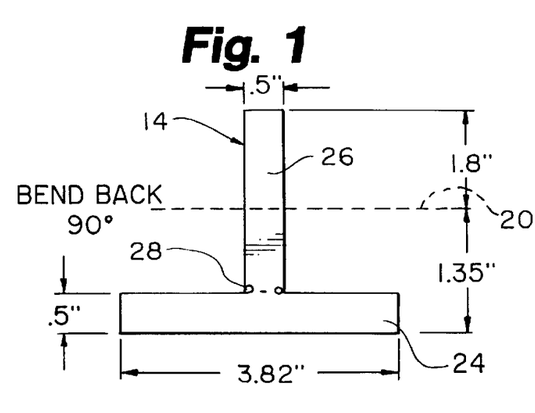
FIG. 1 is a plan form view of the radiator of the present invention.

Referring to FIG. 1, the radiator 14 is formed generally in a T-shape. When installed, the radiator 14 is preferably disposed in an inverted T disposition. Such disposition enhances the performance of the passive radiator 10.

The radiator 14 is preferably formed of a conductive metal foil. The metal foil may be aluminum, brass, or copper. In a preferred embodiment, the metal foil is what is termed "half-hard" brass. The brass may have a thickness between 0.001 inch and 0.030 inch. Preferably, the brass foil is substantially 0.010 inch thick.

The T-shaped radiator 14 has a cross piece 24 and a base leg 26. Preferably, the cross piece has a length dimension between 2.0 inches and 5.0 inches and a width between 0.010 inch and 1.50 inch. In a more preferred embodiment, the length dimension of the cross piece is substantially 3.82 inches and the width dimension of the cross piece is substantially 0.500 inch. Measured from the intersection 28 of the base leg 26 with the cross piece 24, the base leg 26 has a length dimension of between 1.5 inches and 4.0 inches and a width dimension that is between 0.010 inch and 0.750 inch. In a preferred embodiment, the dimensions of the base leg are substantially 2.66 inches taken from the point of intersection 28 with the cross piece 24 and a width dimension that is substantially 0.500 inch. Preferably, the bend line 20 in the base leg 26 is preferably 0.86 inch from the intersection 28 with the cross piece 24.

Figure 3:
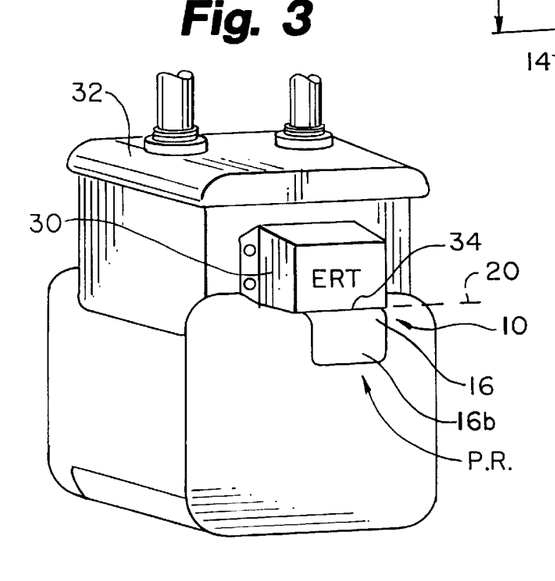
FIG. 3 is a perspective view of an exemplary gas meter with an ERT module affixed thereto and the passive radiator on the present invention adhesively coupled to the ERT module housing.

Referring to FIG. 3, an ERT module 30 is depicted mounted on an exemplary gas meter 32. The passive radiator 10 has been bonded to the underside surface of the ERT module 30. In order to, effect such bonding, the release liner 24 is pulled free of the adhesive 22. Then the passive radiator 10 is pressed upwards into engagement with the underside of the ERT module 30. Preferably, the bend line 20 is disposed proximate the lower front corner margin 34 of the ERT module 30. A portion of the passive radiator 10 depends downward from the bend line 20 with the surface 16b being presented to the viewer. In this configuration, the radiator 14 is capacitively coupled to an oscillator (not shown) of the ERT module 30. The radiator 14 functions as an end-coupled, vertical, half-wave, di-pole that is partially suspended below the ERT module 30. Preferably, the radiator 14 is broadly resonant over the 902–928 MHz range and is capacitively coupled to the microstrip/tank antenna (not shown) of the ERT modules 30.

Figure 4:
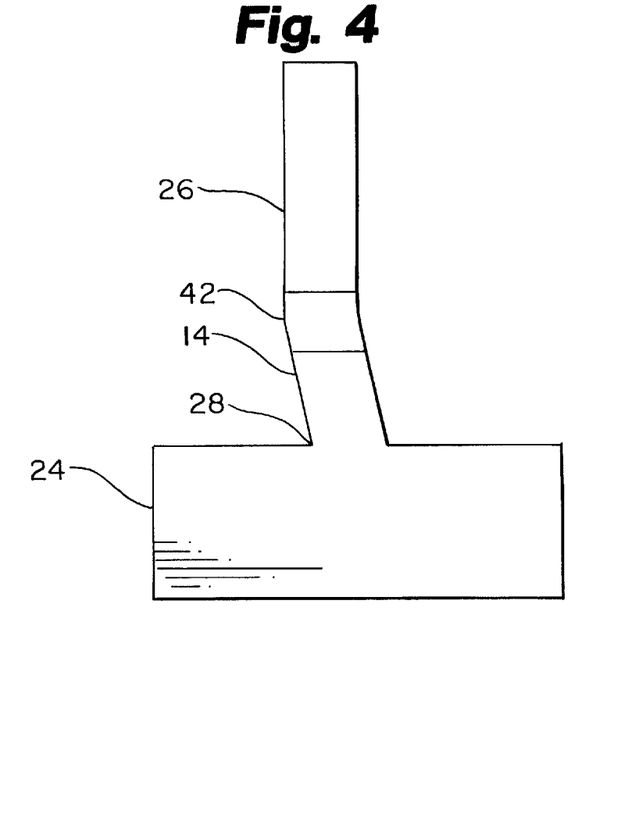
FIG. 4 is an elevational view of the radiator of a second preferred embodiment of the passive radiator of the present invention.
Figure 5:
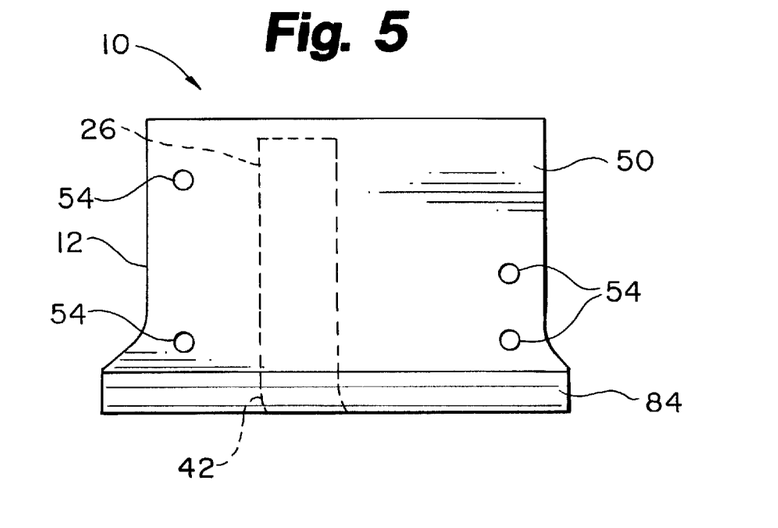
FIG. 5 is a front elevational view of the second preferred embodiment of the passive radiator of the present invention with the radiator of FIG. 4 depicted in phantom.
Figure 6:
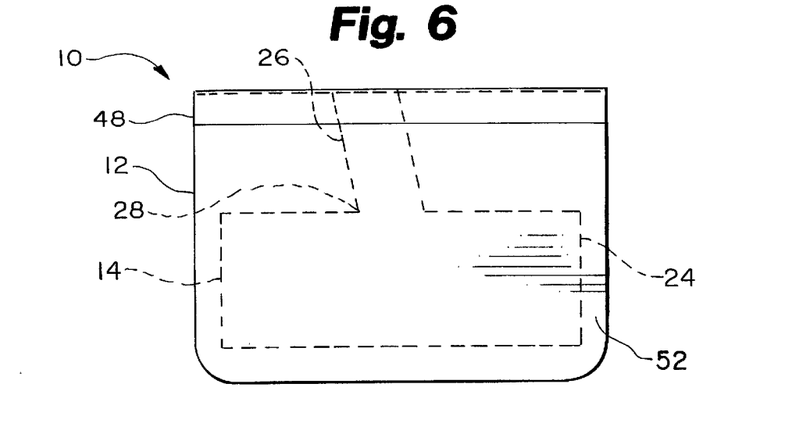
FIG. 6 is a top elevational view of the passive radiator of FIG. 5 with the radiator depicted in phantom.
Figure 7:
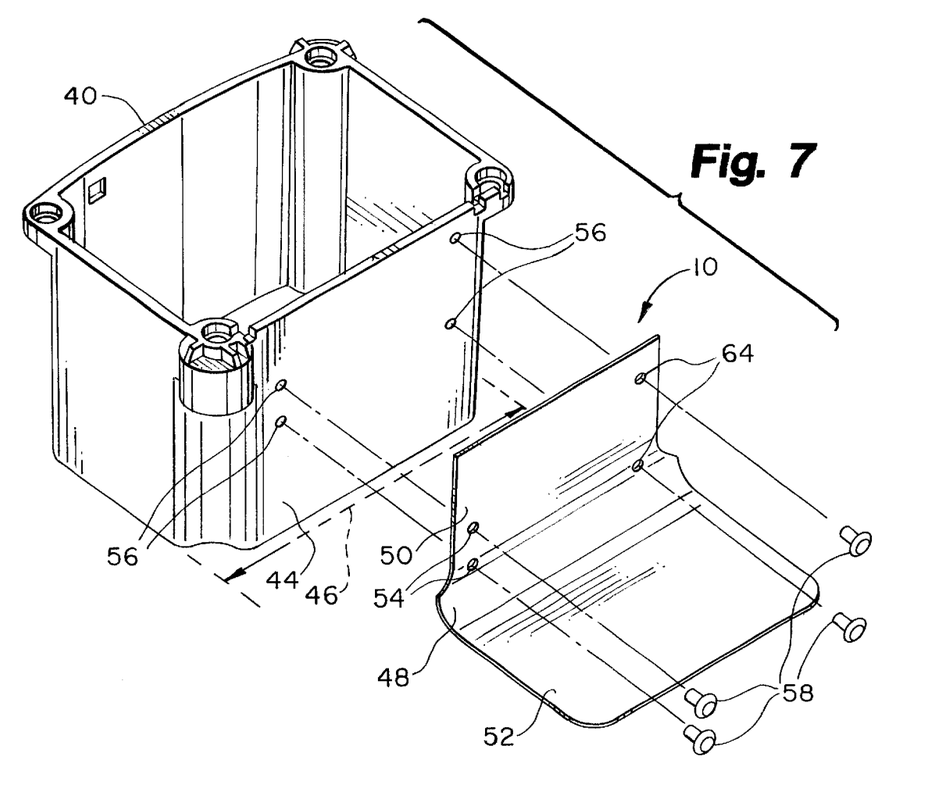
FIG. 7 is an exploded perspective view of the passive radiator in relation to an ERT module housing.
Figure 8:
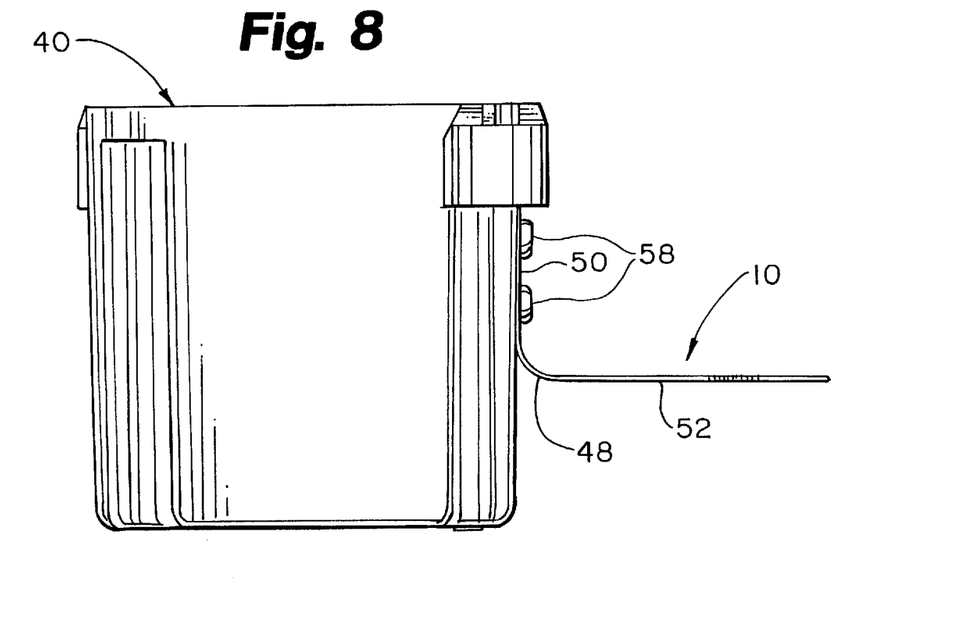
FIG. 8 is a side elevational view of the passive radiator mounted to the ERT module housing.
Figure 9:
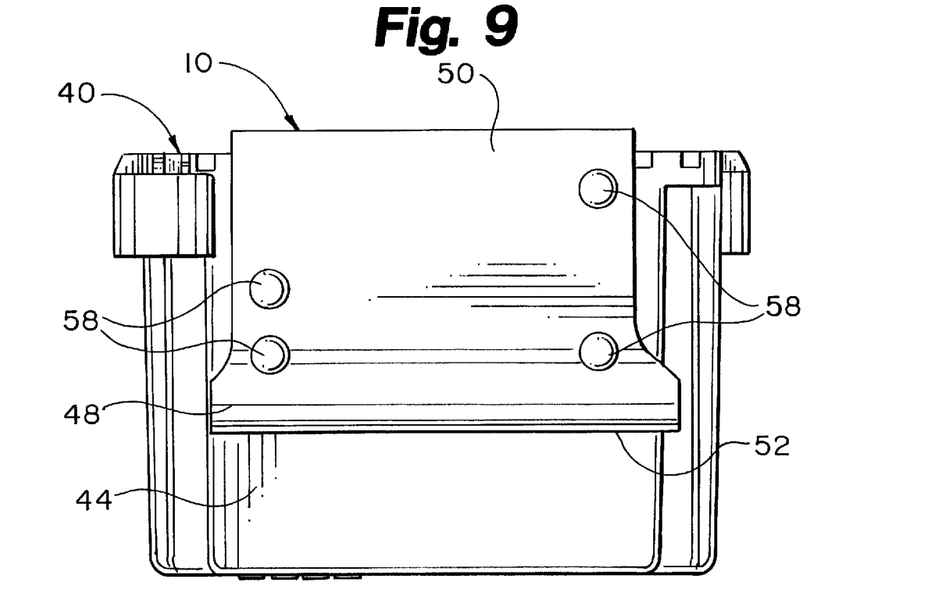
FIG. 9 is a front elevational view of the passive radiator mounted to the ERT module housing.
Figure 10:
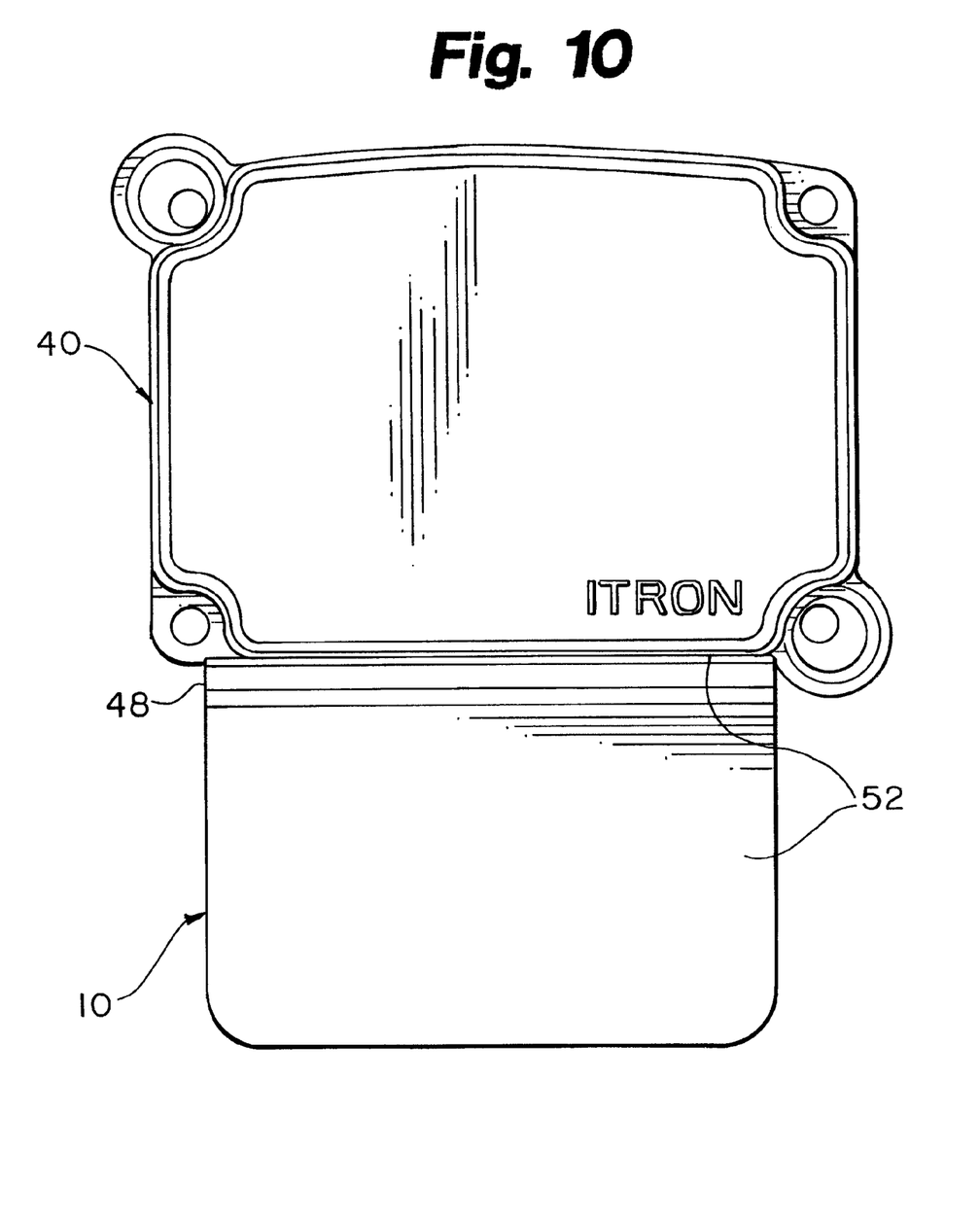
FIG. 10 is a top plan form view of the passive radiator mounted to the ERT module housing.

A second preferred embodiment of the passive radiator 10 is depicted in FIGS. 4–6 and in FIGS. 7–10 wherein the passive radiator is disposed with respect to a selected ERT module housing 40. It should be noted that like numbers with reference to the embodiment of FIGS. 1–3 denote like components in the embodiment of FIGS. 5–10.

Referring to FIG. 4, the metal foil radiator 14 of the passive radiator 10 is depicted in its inverted T-shape. The radiator 14 is designed to mate with the specific ERT module housing 40 of FIGS. 7–10 and a specific ERT module (not shown) disposed within the ERT module housing 40. The specific ERT module disposed in the module housing 40 has a known region in which the capacitive coupling between the radiator 14 and the antenna of the ERT transmitter/receiver is greatest. This point is slightly off center on the front face 44 of the ERT module housing 40. Accordingly, there is a slight lateral bend in the base leg 26 of the radiator 14 between the cross piece 24 and the bend radius 48 in order to shift the base leg 26 slightly left of center of the cross piece 24 so that the distal end of the base leg 26 is disposed proximate the known region of greatest capacitive coupling.

A further constraint in the construction of the radiator 14 was the desire to have the passive radiator 10 be narrower than the width dimension 46 of the ERT module housing 40. In order to ensure adequate reception and transmission of wireless RF energy by the radiator 14, the width dimension of the cross piece 24 was considerably increased as compared to the embodiment of FIGS. 1–3. Preferably, the width dimension of the cross piece 24 is 1.00 inch. The length dimension too has been somewhat foreshortened in relationship to the embodiment of FIGS. 1–3. The length dimension of the cross piece 24 is preferably 2.70 inches. The width of the base leg 26 remains at 0.50 inch and the length of the base leg 26 measured the from point of intersection 28 is preferably 2.55 inches.

Referring to FIGS. 5 and 6, the radiator 14 is disposed within the laminated sheath 12 having first and second laminates (not shown) disposed on either side of the radiator 14, as in the embodiment of FIGS. 1–3. When the first and second laminates are bonded together to form the weather tight sheath 12 with the radiator 14 disposed therein, the passive radiator 10 is essentially complete and may be bent at bend radius 48. The sheath 12 has a memory so that the bend is substantially permanent.

As depicted in FIGS. 5 and 6, the passive radiator 10 has a substantially 90° bend formed through a gradual bend radius 48. The bend radius 48 delineates the juncture between the mount plate 50 and the antenna plate 52. The mount plate 50 is a plurality of bores 54 defined therein. The antenna plate 52 is disposed generally orthogonally with respect to the mount plate 50 and has the cross piece 24 of the radiator 14 contained therein.

Referring to FIGS. 7–10, the ERT module housing 40 has a plurality of bores 56 defined in the front face 44 thereof. The bores 56 are in registry with the bores 54 when the passive radiator 10 is positioned for attachment to the ERT module housing 40. A plurality of rivets 58 are passed through the bores 54 and secured in the bores 56, thereby fixedly attaching the passive radiator 10 to the ERT module housing 40.

A field test was performed of the embodiment of the passive radiator depicted in FIGS. 1–3 to compare the strength of a transmission from an ERT utilizing the passive radiator 10 of the present invention and an ERT not utilizing the passive radiator 10. The test was performed along a county road using electric poles as distance markers from the ERT which was facing west (the direction best suited for transmission of signals from the ERT). The ERT was connected to a gas meter, as depicted in FIG. 3. At each distance marker heading west from the ERT, an attempt was made to receive five signal bursts from the ERT with a multi-channel receiver. The ERT used for this test sends eight signals for each signal burst. The number of signals actually received by the multi-channel receiver per each signal burst, i.e. 0–8, were noted. The results of the field test are provided below in Table 1. The distance from the ERT to the poles increases with the increasing designation of the individual poles, extending from 451 feet to pole 2 to 1794 feet to pole 6.

TABLE 1

| Electric Pole Number | ERT without Passive Radiator (Number of Signals Received in Burst) | Strength of Signal Detected (%) | ERT with Passive Radiator (Number of Signals Received in Burst) | Strength of Signal Detected (%) |
| --- | --- | --- | --- | --- |
| 2 | 8, 7, 8, 7, 7 | 92 | 9, 7, 8, 10, 9 | 107 |
| 2.5 | 6, 4, 7, 6, 7 | 75 | 4, 7, 10, 11, 7 | 97 |
| 2.75 | 1, 3, 1, 3, 1 | 22 | 8, 9, 9, 8, 9 | 107 |
| 3 | 2, 4, 2, 2, 2 | 30 | 11, 5, 8, 10, 9 | 107 |
| 3.5 | 0, 0, 0, 0, 0 | 0 | 7, 6, 6, 9, 7 | 87 |
| 3.75 | No Data Taken | | 7, 7, 10, 7, 8 | 97 |
| 4 | 0, 0, 0, 0, 0 | | 8, 8, 7, 6, 9 | 95 |
| 4.5 | N/A* | N/A* | 8, 7, 7, 7, 7 | 90 |
| 5 | N/A* | N/A* | 6, 6, 6, 7, 2 | 67 |
| 5.5 | N/A* | N/A* | 6, 7, 6, 7, 8 | 34 |
| 6 | N/A* | N/A* | 2, 5, 4, 4, 4 | 47 |
| 6.5 | N/A* | N/A* | 2, 3, 2, 3, 2 | 30 |
| 7 | N/A* | N/A* | 0, 0, 0, 0, 0 | 0 |

N/A*-Data not taken at this pole number as the number of signals detected during each burst had already diminished to 0.

As shown by the results listed in Table 1, in each instance where the receiver was able to detect signals from both the ERT without the passive radiator 10 and the ERT with passive radiator 10, the test receiver was generally able to detect a greater number of signals during each burst from the ERT with the passive radiator 10. It should be noted that in those instances where the number of signals detected during a burst exceeded eight, the signal was actually strong enough such that it was received by more than one channel of the multi-channel test receiver. Additionally, the results of Table 1 show that signals from the five signal bursts were able to be detected from the ERT with the passive radiator 10 at a much greater distance than was possible to detect from the ERT without the passive radiator 10. For example, at pole number 6.5, the multi-channel test receiver was able to detect and receive twelve (2+3+2+3+2) signals from the five signal bursts from a total of forty (8+8+8+8+8) possible signals from the five signal bursts of the ERT with the passive radiator 10. In other words, 30% ($^{12}/_{40}(100)$) of the signals from the ERT with the passive radiator 10 were received by the multi-channel receiver at pole number 6.5. Comparatively, 30% of the signals of the ERT without the passive radiator 10 were able to be received by the multi-channel test receiver at the much shorter distance of pole number 3.

The test results indicate that the passive radiator 10 of the present invention when used in conjunction with an ERT serves to substantially strengthen the signals transmitted from the ERT to greatly enhance signal receptability.

The present invention may be embodied in other specific forms without departing from the spirit of the central attributes thereof. Therefore, the illustrated embodiments should be considered in all respects as illustrative and not restrictive, reference being made to the appended claims rather than to the foregoing description to indicate the scope of the invention.

What is claimed is:

1. An ERT (Encoder Receiver Transmitter) for monitoring the consumption of a metered commodity and having an ERT transmitter for transmitting a signal related to commodity consumption, the ERT transmitter being disposed internally in an ERT housing, the ERT housing providing for the transmission of RF energy therethrough, comprising:
   a single passive radiator being disposed external to the ERT housing and being communicatively, capacitively coupled to the ERT transmitter, the single passive radiator receiving RF wireless communications from the ERT transmitter for wireless transmission and radiating said RF wireless communications.

2. The ERT of claim 1 wherein the passive radiator is an end-coupled, vertical, half-wave dipole.

3. The ERT of claim 1 wherein the passive radiator is formed in a substantially T shape.

4. The ERT of claim 3 wherein the T-shaped passive radiator is suspended below the ERT housing in a generally inverted T disposition.

5. The ERT of claim 4 wherein the invertedly disposed T-shaped passive radiator has a base leg and a cross-piece, the base leg being bent in a substantially right angle disposition when disposed relative to the ERT housing.

6. The ERT of claim 3 wherein the T-shaped passive radiator has a base leg and a crosspiece.

7. The ERT of claim 6 wherein the T-shaped passive radiator crosspiece has a length dimension of between 2.0 inches and 5.0 inches.

8. The ERT of claim 7 wherein the T-shaped passive radiator crosspiece has a length dimension that is substantially 3.82 inches.

9. The ERT of claim 6 wherein the T-shaped passive radiator crosspiece has a width dimension that is between 0.010 inch and 1.50 inches.

10. The ERT of claim 9 wherein the T-shaped passive radiator crosspiece has a width dimension that is substantially 0.500 inch.

11. The ERT of claim 6 wherein the T-shaped passive radiator base leg has a length dimension of between 1.5 inches and 4.0 inches, taken from the point of intersection with the crosspiece.

12. The ERT of claim 11 wherein the T-shaped passive radiator base leg has a length dimension that is substantially 2.66 inches, taken from the point of intersection with the crosspiece.

13. The ERT of claim 6 wherein the T-shaped passive radiator base leg has a width dimension that is between 0.010 inch and 0.750 inch.

14. The ERT of claim 13 wherein the T-shaped passive radiator base leg has a width dimension that is substantially 0.500 inch.

15. The ERT of claim 1 wherein the passive radiator is formed of a conductive metal foil.

16. The ERT of claim 15 wherein the passive radiator metal foil is selected from a list consisting of:
   aluminum;
   brass; and
   copper.

17. The ERT of claim 15 wherein the passive radiator metal foil is formed of half-hard sheet brass.

18. The ERT of claim 17 wherein the passive radiator sheet brass metal foil is between 0.001 inch and 0.030 inch thick.

19. The ERT of claim 18 wherein the passive radiator sheet brass metal foil is substantially 0.010 inch thick.

20. The ERT of claim 15 wherein the passive radiator metal foil is laminated between a first and a second substantially opaque plastic layers.

21. The ERT of claim 20 wherein at least one of the first and the second substantially opaque plastic layers has a pre-applied, all-weather adhesive disposed on an external surface thereof, a peel-off backing being applied over the adhesive.

22. A passive radiator for use with an ERT, the ERT for monitoring the consumption of a metered commodity and having an ERT transmitter/receiver coupled to an ERT antenna for transmitting a signal related to commodity consumption and for receiving signals, comprising:
   radiator means being disposed spaced apart from the ERT antenna and being communicatively, capacitively coupled to the ERT antenna for enhancing the reception and transmission of RF wireless communications by the ERT transmitter/receiver, the radiator means radiating RF communications received from the ERT transmitter/receiver and transmitting RF communications received to the ERT transmitter/receiver, the radiator means comprising the only radiator means of the ERT.

23. The passive radiator of claim 22 wherein the radiator means is an end-coupled, vertical, half-wave dipole.

24. The passive radiator of claim 22 wherein the radiator means is formed in a substantially T shape.

25. The passive radiator of claim 24 wherein the T-shaped radiator means is suspended below a ERT housing in a generally inverted T disposition.

26. The passive radiator of claim 25 wherein the invertedly disposed T-shaped radiator means has a base leg and a crosspiece, the base leg being bent in a substantially right angle disposition when disposed relative to the ERT housing.

27. The passive radiator of claim 24 wherein the T-shaped radiator means has a base leg and a crosspiece.

28. The passive radiator of claim 27 wherein the T-shaped radiator means crosspiece has a length dimension of between 2.0 inches and 5.0 inches.

29. The passive radiator of claim 28 wherein the T-shaped radiator means crosspiece has a length dimension that is substantially 3.82 inches.

30. The passive radiator of claim 27 wherein the T-shaped radiator means crosspiece has a width dimension that is between 0.010 inch and 0.750 inch.

31. The passive radiator of claim 30 wherein the T-shaped radiator means crosspiece has a width dimension that is substantially 0.500 inch.

32. The passive radiator of claim 27 wherein the T-shaped radiator means base leg has a length dimension of between 1.5 inches and 4.0 inches, taken from the point of intersection with the crosspiece.

33. The passive radiator of claim 22 wherein the T-shaped radiator means base leg has a length dimension that is substantially 2.66 inches, taken from the point of intersection with the crosspiece.

34. The passive radiator of claim 27 wherein the T-shaped radiator means base leg has a width dimension that is between 0.010 inch and 0.750 inch.

35. The passive radiator of claim 34 wherein the T-shaped radiator means base leg has a width dimension that is substantially 0.500 inch.

36. The passive radiator of claim 22 wherein the radiator means is formed of a conductive metal foil.

37. The passive radiator of claim 36 wherein the radiator means metal foil is selected from a list consisting of:
   aluminum;
   brass; and
   copper.

38. The passive radiator of claim 36 wherein the radiator means metal foil is formed of half-hard sheet brass.

39. The passive radiator of claim 38 wherein the radiator means sheet brass metal foil is between 0.001 inch and 0.030 inch thick.

40. The passive radiator of claim 39 wherein the radiator means sheet brass metal foil is substantially 0.010 inch thick.

41. The passive radiator of claim 36 wherein the radiator means metal foil is laminated between a first and a second substantially opaque plastic layers.

42. The passive radiator of claim 41 wherein at least one of the first and the second substantially opaque plastic layers has a pre-applied, all-weather adhesive disposed on an external surface thereof, a peel-off backing being applied over the adhesive.

43. A method of enhancing transmission and reception of wireless RF energy communications, the communications being related to commodity usage, comprising the steps of:
   providing a transmitter/receiver;
   disposing a single passive radiator proximate the transmitter/receiver and physically spaced apart therefrom;
   capacitively coupling the passive radiator to the transmitter/receiver; and
   receiving and transmitting wireless RF energy by the transmitter/receiver via the capacitively coupled passive radiator.

* * * * *